US012629961B2

(12) United States Patent
Hobe et al.

(10) Patent No.: US 12,629,961 B2
(45) Date of Patent: May 19, 2026

(54) MULTIPIECE ROAD WHEEL

(71) Applicant: Hutchinson S.A., Paris (FR)

(72) Inventors: Peter Hobe, Levittown, PA (US); Lars Johan Resare, Ewing, NJ (US); Christopher Renson, Langhorne, PA (US); Olivier Noblanc, Yardley, PA (US); Michael Hartman, Lansdale, PA (US)

(73) Assignee: Hutchinson S.A., Paris (FR)

( * ) Notice: Subject to any disclaimer, the term of this patent is extended or adjusted under 35 U.S.C. 154(b) by 0 days.

(21) Appl. No.: 18/416,249

(22) Filed: Jan. 18, 2024

(65) Prior Publication Data

US 2024/0227439 A1     Jul. 11, 2024

Related U.S. Application Data

(63) Continuation of application No. 16/363,177, filed on Mar. 25, 2019, now Pat. No. 11,912,064.

(51) Int. Cl.
B60B 25/00 (2006.01)
B33Y 80/00 (2015.01)

(52) U.S. Cl.
CPC ............ B60B 25/002 (2013.01); B33Y 80/00 (2014.12); B60B 2310/20 (2013.01); B60B 2310/208 (2013.01); B60B 2310/318 (2013.01)

(58) Field of Classification Search
CPC .............. B60B 25/002; B60B 2310/20; B60B 2310/208; B60B 2310/318; B33Y 80/00; B62D 55/14; B62D 55/145
See application file for complete search history.

(56) References Cited

U.S. PATENT DOCUMENTS

| | | | |
|---|---|---|---|
| 2,355,941 A | 8/1944 | Ash | |
| 2,970,867 A | 2/1961 | Ruf | |
| 2,984,524 A | 5/1961 | Franzen | |
| 3,357,752 A | 12/1967 | Ruf | |
| 3,606,497 A | 9/1971 | Gilles | |
| 3,771,843 A | 11/1973 | Clasper et al. | |
| 3,979,154 A | 9/1976 | Groff | |
| 3,993,356 A | 11/1976 | Groff et al. | |

(Continued)

FOREIGN PATENT DOCUMENTS

| | | |
|---|---|---|
| DE | 3428196 A1 | 2/1986 |
| EP | 0035913 B1 | 10/1984 |

(Continued)

OTHER PUBLICATIONS www.tgl-sp.com/product_category/road-wheel, TGL SP Rugged Dynamics, date unknown, believed to be at least as early as 2019.

(Continued)

*Primary Examiner* — S. Joseph Morano
(74) *Attorney, Agent, or Firm* — The Webb Law Firm

(57) ABSTRACT

A road wheel for a tracked vehicle includes a first rim half and a second rim half operatively connected to the first rim half. The first rim half includes at least a first portion that is angled away from the second rim half. The second rim half includes at least a first portion that is angled away from the first rim half. A hollow cavity is formed between the first portion of the first rim half and the first portion of the second rim half.

15 Claims, 16 Drawing Sheets

(56) References Cited

U.S. PATENT DOCUMENTS

| 3,997,217 | A | 12/1976 | Bandet et al. |
| 4,069,856 | A | 1/1978 | Sogge |
| 4,349,234 | A | 9/1982 | Hartmann |
| 4,538,860 | A | 9/1985 | Edwards et al. |
| 4,607,892 | A | 8/1986 | Payne et al. |
| 5,022,718 | A | 6/1991 | Diekevers |
| 5,141,299 | A * | 8/1992 | Korpi ................... B62D 55/145 |
| | | | 305/137 |
| 5,171,074 | A * | 12/1992 | Seksaria ................. B60B 11/02 |
| | | | 305/137 |
| 6,588,861 | B2 | 7/2003 | Smith et al. |
| 6,631,961 | B1 | 10/2003 | Bedford et al. |
| 7,137,675 | B1 | 11/2006 | Simula et al. |
| 7,201,242 | B2 | 4/2007 | Tucker, Jr. |
| 8,398,182 | B2 | 3/2013 | Simula et al. |
| D762,140 | S | 7/2016 | Simula et al. |
| 9,663,163 | B2 | 5/2017 | Hobe et al. |
| 10,059,390 | B2 | 8/2018 | Gustafson |
| 2003/0080617 | A1* | 5/2003 | Smith .................. B62D 55/145 |
| | | | 305/136 |
| 2005/0103540 | A1 | 5/2005 | Lavoie |
| 2006/0103236 | A1 | 5/2006 | Soucy et al. |
| 2010/0133898 | A1 | 6/2010 | Johannsen et al. |
| 2011/0169325 | A1* | 7/2011 | Kaufold ................. F16H 55/06 |
| | | | 305/199 |
| 2012/0153712 | A1 | 6/2012 | Simula et al. |
| 2012/0228926 | A1 | 9/2012 | Bair |
| 2015/0314817 | A1 | 11/2015 | Hobe et al. |
| 2016/0031500 | A1 | 2/2016 | Renson et al. |
| 2016/0114840 | A1 | 4/2016 | L'Herault et al. |
| 2018/0100245 | A1* | 4/2018 | Liu ......................... C09D 5/08 |
| 2018/0170464 | A1 | 6/2018 | De Brouwer et al. |

FOREIGN PATENT DOCUMENTS

| JP | S4850432 A | 7/1973 |
| JP | S5320201 A | 2/1978 |

OTHER PUBLICATIONS www.tgl-sp.com/wp-content/uploads/2019/01/M60-ROAD-WHEEL.
pdf; TGL SP Rugged Dynamics, at least as early as May 22, 2019.
Office Action issued in CA3, 131,567 on Jan. 26, 2026.

* cited by examiner

2

2

MULTIPIECE ROAD WHEEL

CROSS-REFERENCE TO RELATED APPLICATIONS

This application is a continuation of U.S. patent application Ser. No. 16/363,177, filed on Mar. 25, 2019, entitled "Multipiece Road Wheel". All subject matter set forth in the above-referenced application is hereby incorporated by reference in its entirety.

BACKGROUND OF THE INVENTION

Field of the Invention

The present disclosure is generally directed to a road wheel and, in particular, to a multipiece road wheel assembly.

Description of Related Art

In certain tracked vehicles, a plurality of road wheels are provided to support elastomeric pads that assist in moving the vehicle along a ground surface. The elastomeric pads are mounted on an outer circumferential surface of the road wheel. A typical road wheel geometry includes a mounting disc that transitions to a cylindrical surface, onto which the elastomeric pad is adhered. The cylindrical surface includes a supported end closest to the mounting disc, and a cantilevered end opposite the mounting disc. The design of the cantilevered end must be bolstered to resist deflection and strain under loading, while being easy to manufacture and providing sufficient vehicle clearance.

Numerous road wheel designs are made from steel and aluminum. Typical steel road wheels in use today have a reverse flange integral to the cylindrical portion of the road wheel, which is formed by rolling the material inwards towards the axis of the road wheel. This stiffening flange is typically the same thickness as the hoop portion, since it is formed from a single piece of sheet or coil material with a constant thickness. Other steel road wheel designs include a separate vertical support ring attached to a separate cylindrical hoop of different thickness. These elements are permanently joined together by welding the outer diameter of the ring to the inside diameter of the hoop.

Aluminum road wheels in use today are typically machined from a forging, and include an integral thicker, local section at the cantilevered end to resist deflection and reduce strain. U.S. Pat. No. 9,663,163 discloses such an aluminum road wheel. This design requires significant additional material, resulting in a weight penalty. Additional existing road wheels are made of either steel or aluminum with integral radial stiffening ribs (spokes) that extend inside the cylindrical surface for support of the cantilevered end, which often catch debris from the external environment of the road wheel.

Other existing road wheel designs include a T-shaped design, in which the spoke is connected to the elastomeric pad supporting member at a midpoint across the width, with a separate cantilevered wear ring supporting flange. This design, while yielding low weight, has inherent manufacturing challenges associated with producing the undercut area behind the wear ring flange. Also, a near net shape forging with optimal grain flow is not possible in this area due to the proximity of the supporting flange to the spoke and elastomeric pad member.

Yet another existing road wheel design includes a single-piece hollow road wheel formed by casting with sand cores. A single hollow road wheel requires more elaborate, complex, and expensive fabrication methods, such as the use of semi-permanent casting which uses steel molds to form the exterior geometry and one or more sand cores to form the hollow internal cavities. The sand core is subsequently destroyed and removed post-casting through access holes in the external surface to produce the hollow design.

SUMMARY OF THE INVENTION

In one example of the present disclosure, a road wheel for a tracked vehicle includes a first rim half and a second rim half operatively connected to the first rim half. The first rim half includes at least a first portion that is angled away from the second rim half. The second rim half includes at least a first portion that is angled away from the first rim half. A hollow cavity is formed between the first portion of the first rim half and the first portion of the second rim half.

In another example of the present disclosure, the first rim half and the second rim half are operatively connected to one another via at least one fastener around the perimeter, and at least one lug fastener connects the rim halves at a center portion. A wear ring may be positioned on an outer surface of the second rim half. The first rim half and the second rim half are operatively connected to one another via at least one fastener that also fastens the wear ring to the second rim half. At least one of the first rim half and the second rim half is a fabricated component using a mold, using a tool, being machined, through additive manufacturing, being joined together from multiple pieces, or a combination thereof. The first rim half is interlocked with the second rim half via a dovetail connection. The first rim half and the second rim half are operatively connected via at least one fastener. A spacer element is provided on the at least one fastener element to maintain the hollow cavity defined by the first rim half and the second rim half and to resist deformation by a fastener clamp load. The first rim half or the second rim half includes a flange that extends from an outer radial edge of the first rim half or the second rim half to support an elastomeric pad.

In another example of the present disclosure, a road wheel assembly includes an elastomeric pad and a road wheel, including a first rim half, and a second rim half operatively connected to the first rim half. The elastomeric pad is adhered onto the road wheel. The first rim half includes at least a first portion that is angled away from the second rim half. The second rim half includes at least a first portion that is angled away from the first rim half. A hollow cavity is formed between the first portion of the first rim half and the first portion of the second rim half.

In another example of the present disclosure, the first rim half and the second rim half are operatively connected to one another via at least one fastener. A wear ring may be positioned on an outer surface of the second rim half. The first rim half and the second rim half are operatively connected to one another via at least one fastener that also fastens the wear ring to the second rim half. At least one of the first rim half and the second rim half is a fabricated component made using a mold, using a tool, being machined, through additive manufacturing, being joined together from multiple pieces, or a combination thereof. The first rim half is interlocked with the second rim half via a dovetail connection. The first rim half and the second rim half are operatively connected via at least one fastener. A spacer element is provided on the at least one fastener element to maintain the hollow cavity defined by the first rim half and the second rim half and to resist deformation by a fastener clamp load. The first rim half or the second rim half includes a flange that extends from an outer radial edge of the first rim half or the second rim half to support the elastomeric pad. An additional road wheel may be provided. The road wheel may be connected to the additional road wheel to form a recessed region between the road wheels. The recessed region may be created by the configuration and dimensions of the road wheels, and is configured and dimensioned to accommodate a guide on a track. A first wear ring may be attached to the road wheel and a second wear ring may be attached to the additional road wheel and may be made of a material that has greater wear resistance than a material used for the road wheels.

In another example of the present disclosure, a method of manufacturing a road wheel for a tracked vehicle includes forging a first rim half; forging a second rim half; and operatively connecting the first rim half to the second rim half thereby establishing a hollow cavity defined between the first rim half and the second rim half. The first rim half and the second rim half are operatively connected using at least one fastener. The method may further include adhering an elastomeric pad onto either the first rim half or the second rim half. The method may further include attaching a wear ring to either the first rim half or the second rim half.

The present invention is also disclosed according to the following clauses:

Clause 1: A road wheel for a vehicle, comprising: a first rim half; and a second rim half operatively connected to the first rim half, wherein the first rim half comprises at least a first portion that is angled away from the second rim half, wherein the second rim half comprises at least a first portion that is angled away from the first rim half, and wherein a hollow cavity is formed between the first portion of the first rim half and the first portion of the second rim half.

Clause 2: The road wheel as recited in Clause 1, wherein the first rim half and the second rim half are operatively connected to one another via at least one fastener around the perimeter, and at least one lug fastener connects the rim halves at a center portion.

Clause 3: The road wheel as recited in Clause 1 or 2, further comprising a wear ring that is positioned on an outer surface of the second rim half.

Clause 4: The road wheel as recited in Clause 3, wherein the first rim half and the second rim half are operatively connected to one another via at least one fastener that also fastens the wear ring to the second rim half.

Clause 5: The road wheel as recited in any of Clauses 1-4, wherein at least one of the first rim half and the second rim half is a fabricated component made using a mold, using a tool, being machined, through additive manufacturing, being joined together from multiple pieces, or a combination thereof.

Clause 6: The road wheel as recited in any of Clauses 1-5, wherein the first rim half is interlocked with the second rim half via a dovetail connection.

Clause 7: The road wheel as recited in any of Clauses 1-6, wherein the first rim half and the second rim half are operatively connected via at least one fastener, and wherein a spacer element is provided on the at least one fastener element to maintain the hollow cavity defined by the first rim half and the second rim half and to resist deformation by a fastener clamp load.

Clause 8: The road wheel as recited in any of Clauses 1-7, wherein the first rim half or the second rim half comprises a flange that extends from an outer radial edge of the first rim half or the second rim half to support an elastomeric pad.

Clause 9: A road wheel assembly, comprising: an elastomeric pad; and a road wheel, comprising: a first rim half; and a second rim half operatively connected to the first rim half, wherein the elastomeric pad is adhered onto the road wheel, wherein the first rim half comprises at least a first portion that is angled away from the second rim half, wherein the second rim half comprises at least a first portion that is angled away from the first rim half, and wherein a hollow cavity is formed between the first portion of the first rim half and the first portion of the second rim half.

Clause 10: The road wheel assembly as recited in Clause 9, wherein the first rim half and the second rim half are operatively connected to one another via at least one fastener.

Clause 11: The road wheel assembly as recited in Clause 9 or 10, further comprising a wear ring that is positioned on an outer surface of the second rim half.

Clause 12: The road wheel assembly as recited in Clause 11, wherein the first rim half and the second rim half are operatively connected to one another via at least one fastener that also fastens the wear ring to the second rim half.

Clause 13: The road wheel assembly as recited in any of Clauses 9-12, wherein at least one of the first rim half and the second rim half is a fabricated component made using a mold, using a tool, being machined, through additive manufacturing, being joined together from multiple pieces, or a combination thereof.

Clause 14: The road wheel assembly as recited in any of Clauses 9-13, wherein the first rim half is interlocked with the second rim half via a dovetail connection.

Clause 15: The road wheel assembly as recited in any of Clauses 9-14, wherein the first rim half and the second rim half are operatively connected via at least one fastener, and wherein a spacer element is provided on the at least one fastener element to maintain the hollow cavity defined by the first rim half and the second rim half and to resist deformation by a fastener clamp load.

Clause 16: The road wheel assembly as recited in any of Clauses 9-15, wherein the first rim half or the second rim half comprises a flange that extends from an outer radial edge of the first rim half or the second rim half to support the elastomeric pad.

Clause 17: The road wheel assembly as recited in any of Clauses 9-16, further comprising an additional road wheel, wherein the road wheel is connected to the additional road wheel to form a recessed region between the road wheels, wherein the recessed region is created by the configuration and dimensions of the road wheels, and is configured and dimensioned to accommodate a guide on a track.

Clause 18: The road wheel assembly as recited in Clause 17, wherein a first wear ring attached to the road wheel and a second wear ring attached to the additional road wheel are made of a material that has greater wear resistance than a material used for the road wheels.

Clause 19: A method of manufacturing a road wheel for a tracked vehicle, comprising: forging a first rim half; forging a second rim half; and operatively connecting the first rim half to the second rim half thereby establishing a hollow cavity defined between the first rim half and the second rim half.

Clause 20: The method as recited in Clause 19, wherein the first rim half and the second rim half are operatively connected using at least one fastener.

Clause 21: The method as recited in Clause 19 or 20, further comprising adhering an elastomeric pad onto either the first rim half or the second rim half.

Clause 22: The method as recited in any of Clauses 19-21, further comprising attaching a wear ring to either the first rim half or the second rim half.

DESCRIPTION OF THE INVENTION

Figure 1:
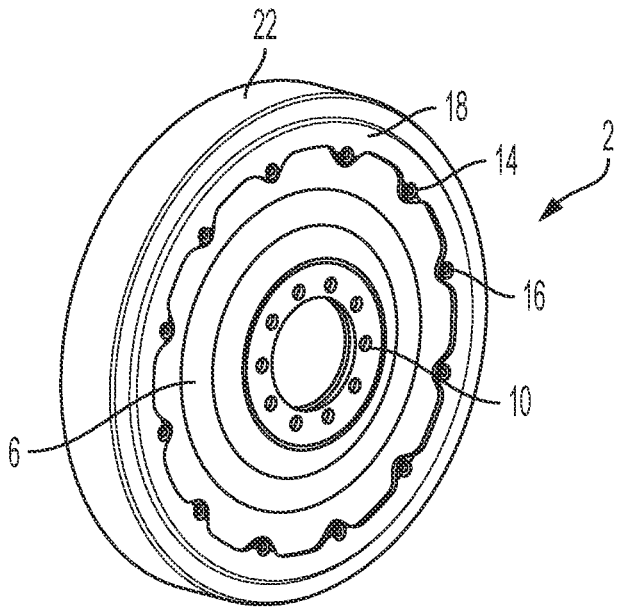
FIG. 1 is a front perspective view of a road wheel and an elastomeric pad according to an example of the present disclosure.

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a wheel assembly and, in particular, to a multipiece road wheel assembly. Certain preferred and non-limiting aspects of the components of the road wheel are illustrated in FIGS. 1-9.

With reference to FIGS. 1-5, a first example of a road wheel 2 according to the present disclosure is shown and described. The road wheel 2 includes an inner rim 4 and an outer rim 6 that are operatively connected to one another. The inner rim 4 and the outer rim 6 may be fabricated components made using a mold, using a tool, being machined, through additive manufacturing, being joined together from multiple pieces, or a combination thereof. In one example, the rims 4, 6 are substantially circular in shape and are inclined relative to one another in portions so that, when assembled, the rims 4, 6 contact one another at a center position or axis C with portions 5a, 5b, spaced from one another at an intermediate radial position with portions 7a, 7b, and are connected again to one another 4, 6 at an outermost radial position with portions 7c, 7d. A first set of apertures 8, 10 are defined in a circumferential pattern around a center portion of each rim 4, 6. A second set of apertures 12, 14 are defined in a circumferential pattern around an outer edge portion of each rim 4, 6. The two rims 4, 6 are operatively connected or fastened to one another using a plurality of fasteners, which may include the lug fasteners that are used to affix the road wheel 2 to the vehicle hub (not shown) at the center portion, combined with a plurality of wear ring fasteners 16 that are used to affix a wear ring 18 to an outer perimeter of an outer surface of the inner rim 4 and/or the outer rim 6. This configuration of the road wheel 2 results primarily in a significantly reduced overall weight for the road wheel 2, since it uses a minimum amount of high-strength material yet provides high lateral and radial stiffness as compared to existing road wheels.

By using two individual rims 4, 6 joined together by wear ring fasteners 16 and lug fasteners, several different manufacturing methods can be used to manufacture and assemble the road wheel 2. In one example, forging or casting can be used to form the road wheel 2 followed by a machining process. The forging process can be used to produce a high-strength, hollow design that was previously not possible by forging a single piece of material. Forging yields a road wheel 2 of superior strength and ductility, and is highly desirable for a road wheel as compared to the aforementioned casting process. The rims 4, 6 of the road wheel 2 work together as a unit to resist deformation and stress or strain from external loading on the elastomeric pad 22 and the wear ring 18. This is the case for both radial loading and lateral loading, and provide a unique benefit of the hollow configuration of the present road wheel 2.

Figure 2:
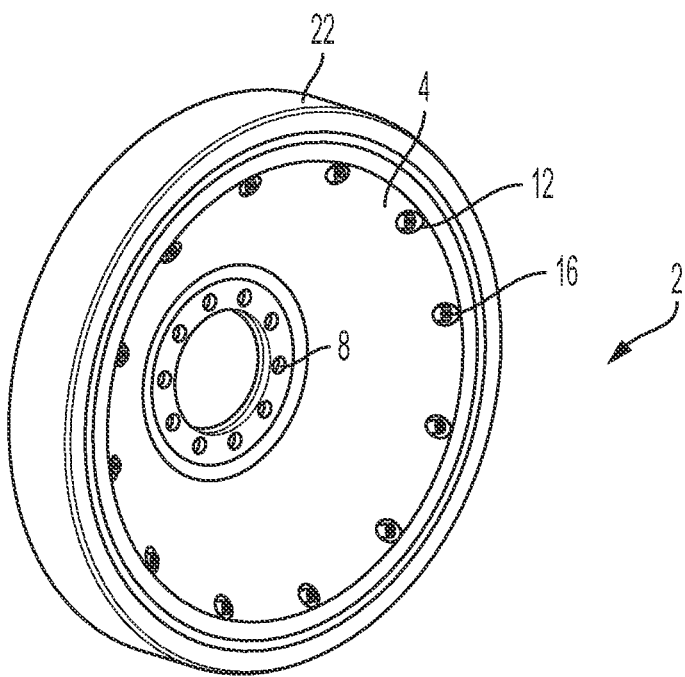
FIG. 2 is a rear perspective view of the road wheel and elastomeric pad of FIG. 1.
Figure 3:
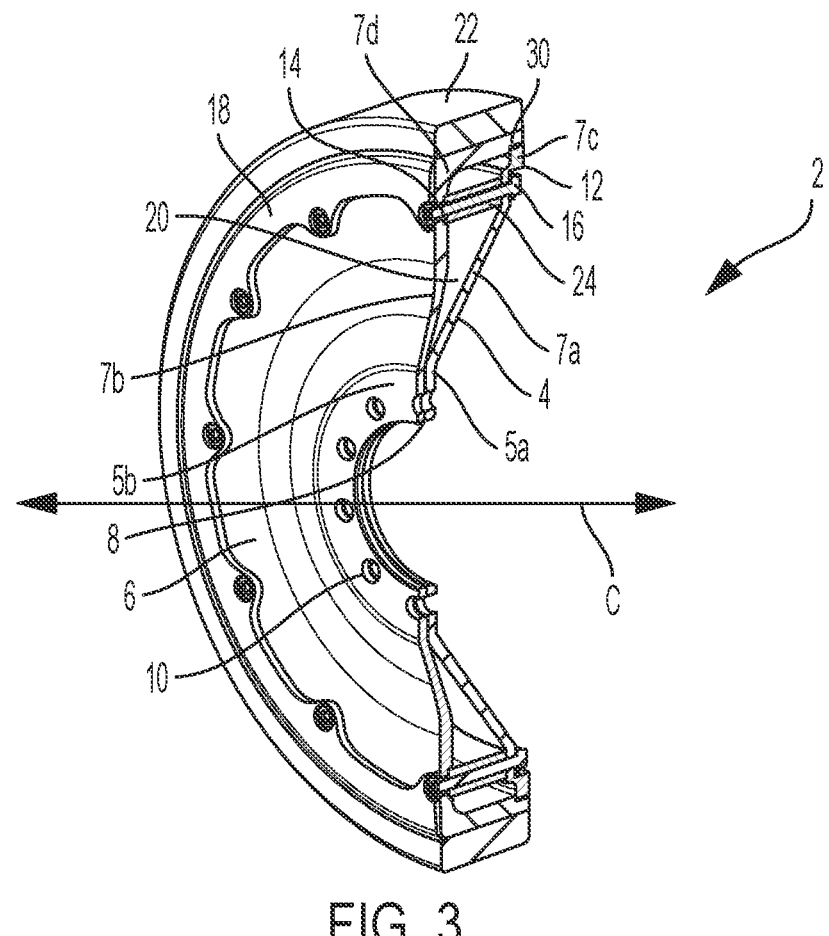
FIG. 3 is a cross-sectional view of the road wheel and elastomeric pad of FIG. 1.

As shown in FIG. 2, since the rims 4, 6 include radial intermediate portions that extend away from the opposing rim, a hollow cavity 20 is formed between the two rims 4, 6. Due to the enclosed box section formed by the hollow geometry, support is provided on each outer side of an elastomeric pad 22 that is adhered onto the road wheel 2, rather than using a single end of a single rim with a cantilevered unsupported section, or an intermediate location between ends with dual cantilevers. With regard to vertical loading, the enclosed box section created by the hollow cavity 20 supports the cylindrical portion of the rims 4, 6 at each end 7c, 7d. These separated supports are analogous to a simply supported beam resisting an intermediate vertical load, where each end is responsible for a portion of the load. This design is inherently stronger than current road wheel designs where only one end supports the entire load. Current road wheels designs have a cross section analogous to a cantilever beam resisting the entire intermediate vertical load solely at a single end with the other end remaining unsupported. Other road wheel designs are analogous to a central radial member supporting a beam with a cantilevered unsupported section extending in both directions. While they provide superior support for loads aligned with the central radial member, end or intermediate loads impart a moment to the radial support, requiring additional material or flanges at the end to increase stiffness. This not only increases weight but also adds significant manufacturing challenges to form undercut cavities beneath the cylindrical portion of the rim and adjacent to the radial support. The geometrical separation of the radial intermediate portion of the rims 4, 6 from one another yields a superior stiffness and resistance to the external loads but requires less material. This is accomplished in current road wheel designs by increased section thickness, varied section geometry, or some combination thereof to resist similar loading, but requires more material resulting in a heavier wheel. With regard to lateral loading, the enclosed box section created by the hollow cavity 20 provides a similar benefit that is described above for resisting vertical loading, however the section resists deflection due to the rim 4 connected to the lug pattern of fasteners 16 through the rim 4. Two thinner rims spaced at the width of the wheel resist the lateral load, rather than a single, thicker rim. This results in a lighter wheel with superior lateral stiffness. The present road wheel 2 may be made from multiple components, which can be made from materials including a ferrous alloy, an aluminum alloy, a magnesium alloy, a titanium alloy, plastic, fiber reinforced composite, aluminum metal matrix composite, and mixtures thereof to achieve a similar cross-sectional geometry.

Figure 10:
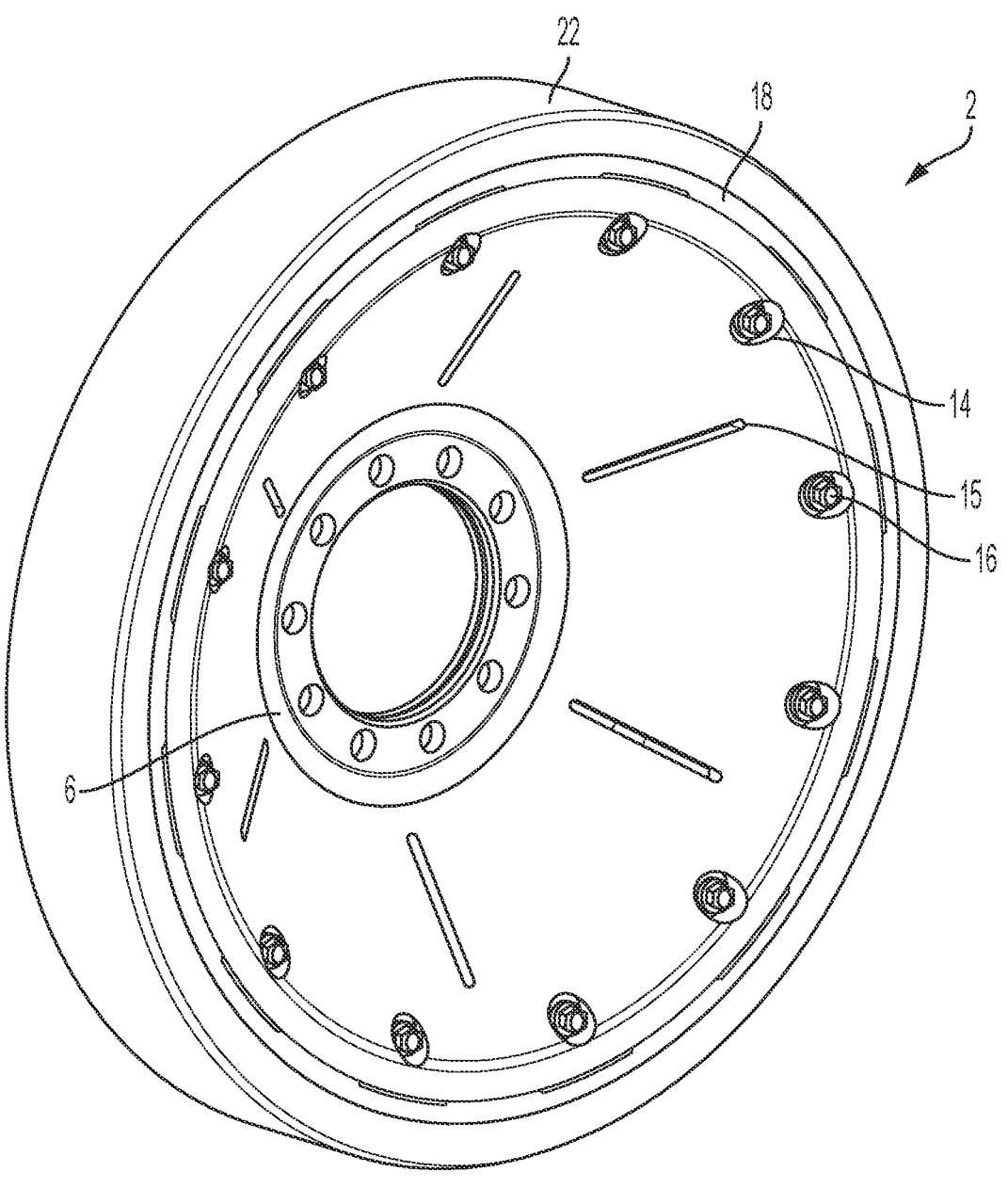
FIG. 10 is a perspective view of the road wheel and elastomeric pad of FIG. 1 including vent passageways.
Figure 11:
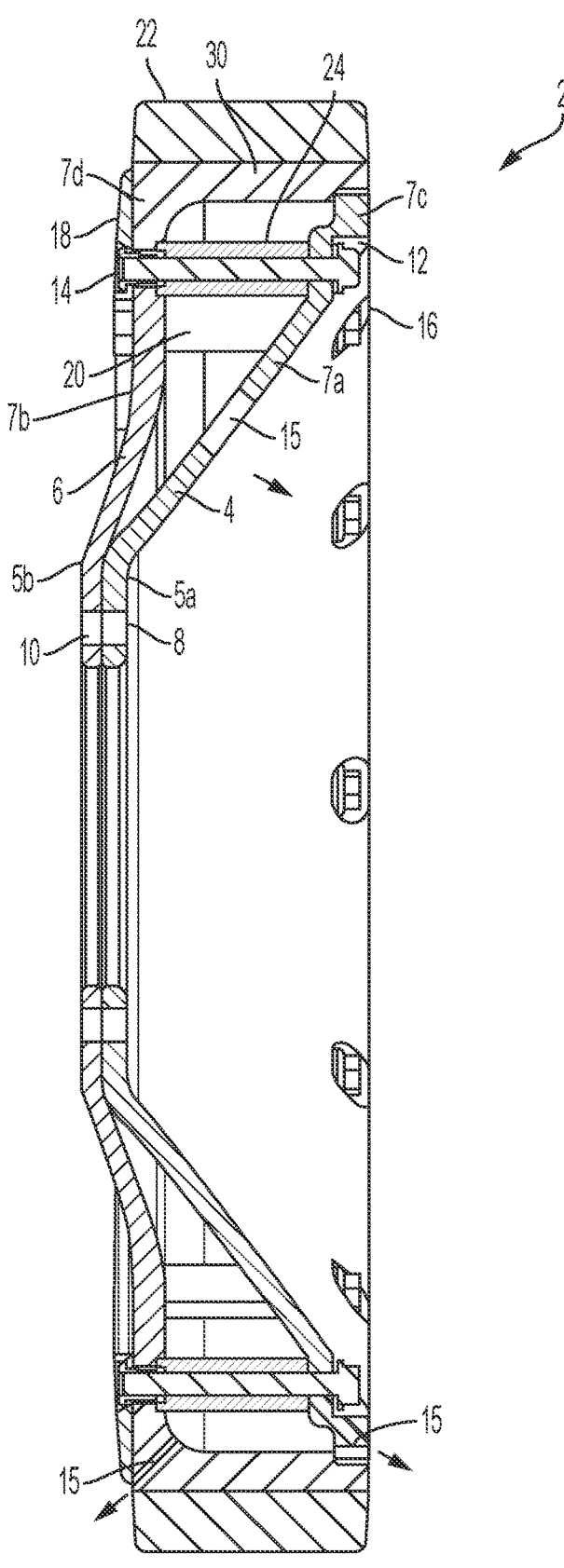
FIG. 11 is a cross-sectional view of the road wheel and elastomeric pad of FIG. 1 including vent passageways.
Figure 12A:
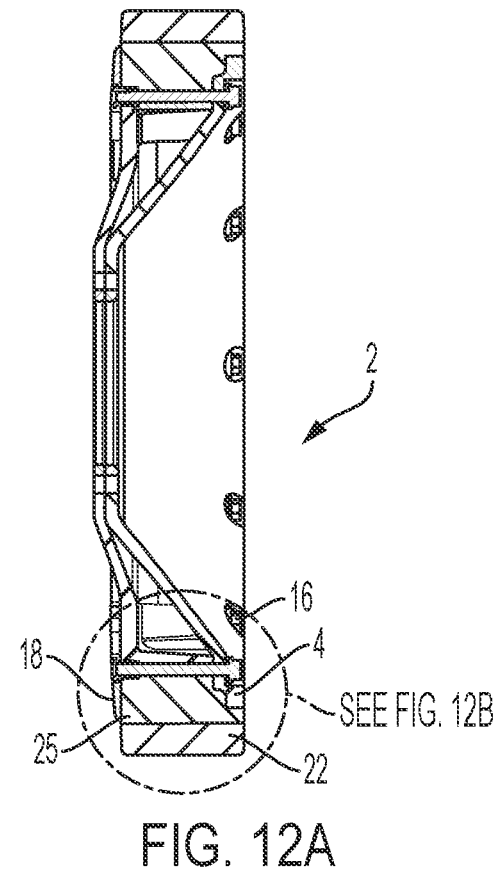
FIG. 12A is a cross-sectional view of the road wheel and elastomeric pad of FIG. 1 including integrated spacers.
Figure 12B:
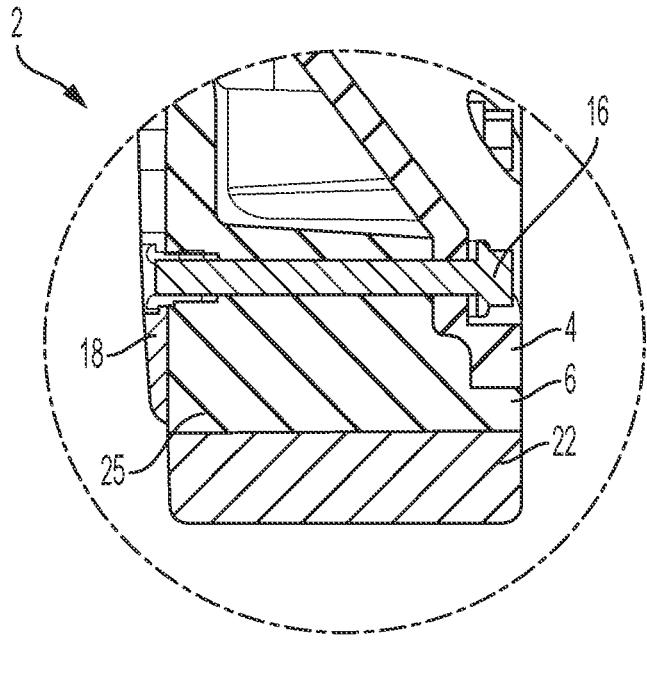
FIG. 12B is an isolated view of the road wheel and elastomeric pad of FIG. 12A including the integrated spacers.
Figures 13A, 13B:
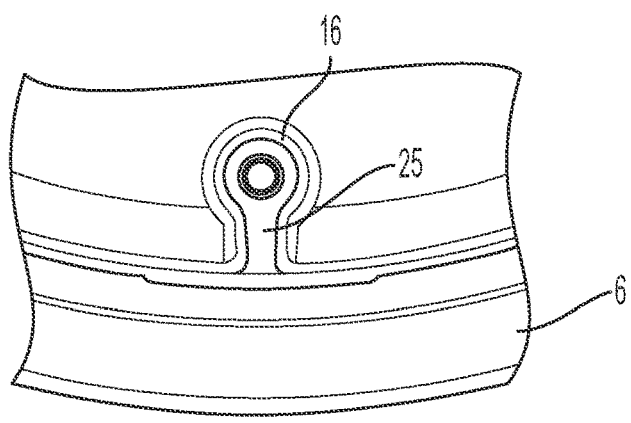
FIG. 13A is another isolated view of the road wheel and elastomeric pad of FIG. 12A including the integrated spacers.
FIG. 13B is an exploded view of the road wheel and elastomeric pad of FIG. 12A.

In another example of the present disclosure, instead of being fastened together, the two rims 4, 6 may be permanently joined together by welding, press-fit, adhesive, or similar joining methods, which would result in a single-piece road wheel configuration. This configuration results in fewer components to handle and service, namely only the wear ring 18 (which is replaceable) and the elastomeric pad 22 (which can be refurbished via re-rubberization). In the event the rims 4, 6 are not permanently joined together and sealed from external elements, the hollow cavity 20 could be subject to moisture build-up due to condensation or ingress of water, grit, silt, mud, and other elements during fording events. In this case, the use of a sealing feature located at both at both the center position 11 (e.g., just outboard of the lug pattern) and at the radial perimeter 13 of the road wheel 2 could be used to seal the hollow cavity 20 during assembly. In one example, potential sealing features could include a rubber O-ring seated within a groove located along a circumferential interface between the rims 4, 6, or a gasket composed of rubber, a caulk-like sealing compound, a silicone sealant, or similar materials intended to insulate the internal cavity 20 from environmental contamination. In another example, as shown in FIGS. 10 and 11, a vent hole or series of vent holes, slots, grooves, or notches 15 could be defined in the road wheel 2 to permit egress of any water, liquid, or debris from the hollow cavity 20 and allow residual liquid inside the hollow cavity 20 to evaporate.

The smooth external surfaces of the rims 4, 6 provide a debris-shredding contour, which avoid entrapment of debris that is typically caused by recesses or cavities present on the external surfaces of the rims 4, 6. This is a beneficial feature of the present road wheel 2 since debris entrapped in the road wheel 2 can accumulate over time, thereby increasing the wheel weight and contributing to imbalance and vibration of the road wheel 2. The combined use of the lug fasteners and the wear ring fasteners 16 reduces the need for additional fasteners to join the rims 4, 6 together, reducing the overall number of components of the road wheel 2. It is also contemplated, however, that an additional set of fasteners used only for joining the rims 4, 6 together adjacent the lug pattern, around the perimeter, or in both locations, separate from the lug and wear ring fasteners 16 may be provided. It is also contemplated that other types of fasteners could be used in place of the fasteners, including rivets, pressed-in studs and nuts, blind bolts, or screws.

The replacement of the wear ring 18 due to excessive wear or damage does not necessarily require removal of the first rim 4 from the second rim 6, which are piloted together by a register surface around the perimeter of the road wheel 2. The rim pieces 4, 6 may remain in place while only the wear ring 18 is replaced. The wear ring 18 may be a continuous, single-piece configuration, or divided into two or more segments, secured with the same set of wear ring fasteners 16 used to join the first and second rims 4, 6. For a segmented wear ring configuration, the fastener pattern may be evenly spaced or re-distributed such that some of the fasteners 16 are closer to the ends of each segment to provide increased resistance to separation from the rim 6. As shown in FIG. 1, the continuous wear ring design uses through bolts 16 on a smaller bolt circle than the primary wear surface of the wear ring 18. This wear ring configuration utilizes spacers 24 positioned between the rims 4, 6 in the hollow cavity 20 to properly clamp the rims 4, 6 together and develop pretension in the fasteners 16 without excessively crushing or deforming either rim 4, 6. The spacers 24 are pre-assembled into the inner rim 4 by interference fit to minimize the quantity of loose parts and provide alignment for ease of assembly of the wear ring fasteners 16. In another example, shown in FIGS. 12A-13B, integrated spacers 25 can be manufactured as a structural feature of the outer rim 6. The integrated spacers 25 would function in a similar fashion to the spacers 24 that are produced separately but would require additional assembly. The wear ring 18 may also include threaded inserts pre-assembled by interference fit to minimize the quantity of loose parts in the road wheel 2, and provide a more robust bolted joint between the rims 4, 6.

The replacement of the wear ring 18 due to excessive wear or damage does not necessarily require removal of the first rim 4 from the second rim 6, which are piloted together by a register surface around the perimeter of the road wheel 2. The rim pieces 4, 6 may remain in place while only the wear ring 18 is replaced. The wear ring 18 may be a continuous, single-piece configuration, or divided into two or more segments, secured with the same set of wear ring fasteners 16 used to join the first and second rims 4, 6. For a segmented wear ring configuration, the fastener pattern may be evenly spaced or re-distributed such that some of the fasteners 16 are closer to the ends of each segment to provide increased resistance to separation from the rim 6. As shown in FIG. 1, the continuous wear ring design uses through bolts 16 on a smaller bolt circle than the primary wear surface of the wear ring 18. This wear ring configuration utilizes spacers 24 positioned between the rims 4, 6 in the hollow cavity 20 to properly clamp the rims 4, 6 together and develop pretension in the fasteners 16 without excessively crushing or deforming either rim 4, 6. The spacers 24 are pre-assembled into the inner rim 4 by interference fit to minimize the quantity of loose parts and provide alignment for case of assembly of the wear ring fasteners 16. In another example, shown in FIGS. 12 and 13, integrated spacers 25 can be manufactured as a structural feature of the outer rim 6. The integrated spacers 25 would function in a similar fashion to the spacers 24 that are produced separately but would require additional assembly. The wear ring 18 may also include threaded inserts pre-assembled by interference fit to minimize the quantity of loose parts in the road wheel 2, and provide a more robust bolted joint between the rims 4, 6.

Figure 4:
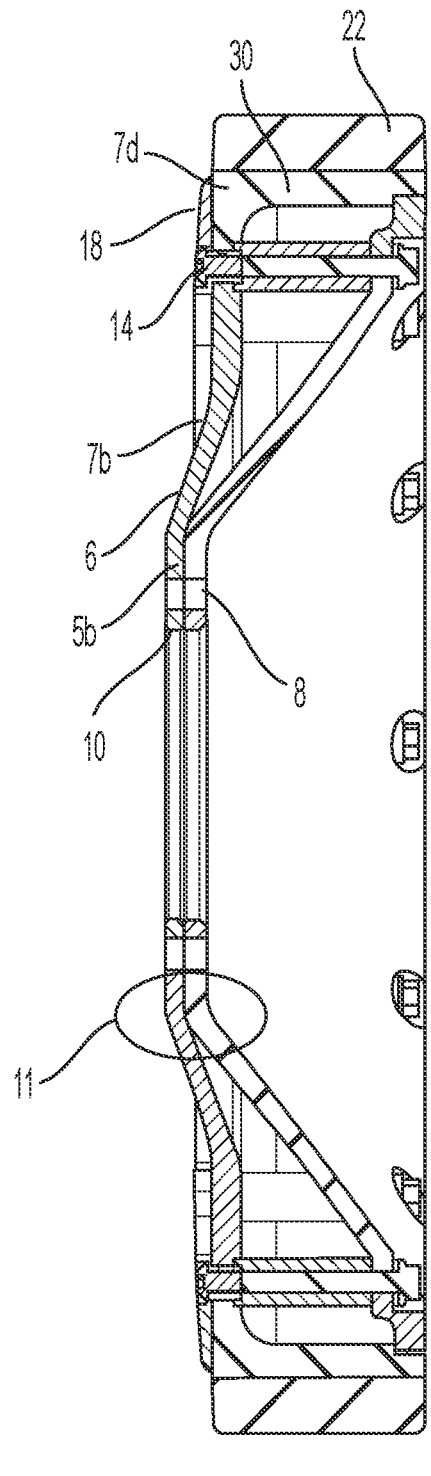
FIG. 4 is another cross-sectional view of the road wheel and elastomeric pad of FIG. 1.
Figure 5A:
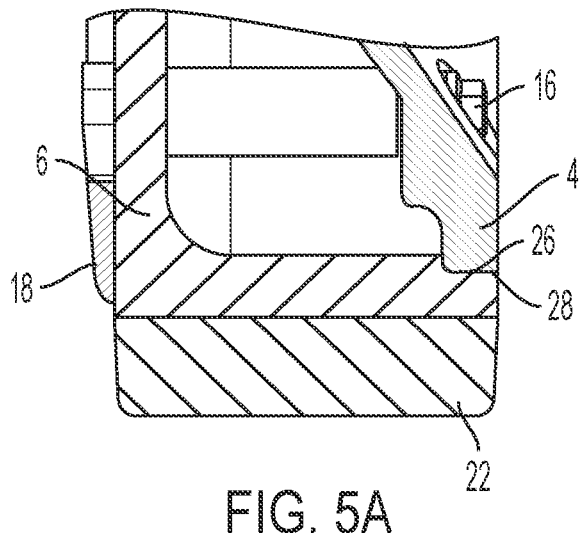
FIG. 5A is an isolated cross-sectional view of the road wheel and elastomeric pad of FIG. 1.
Figure 5B:
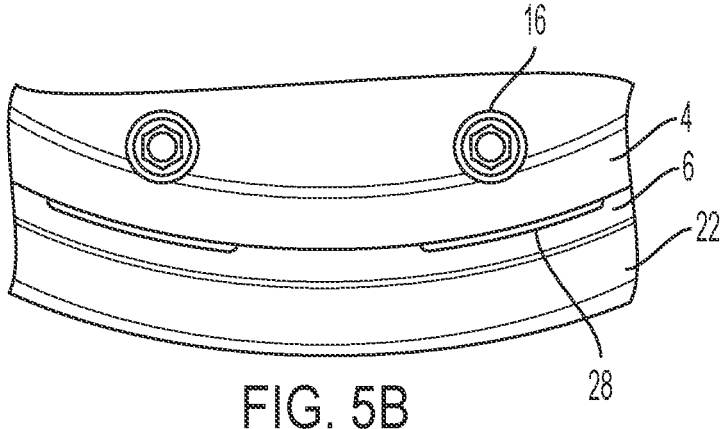
FIG. 5B is a front view of the portion of the road wheel and elastomeric pad shown in FIG. 5A.
Figure 5C:
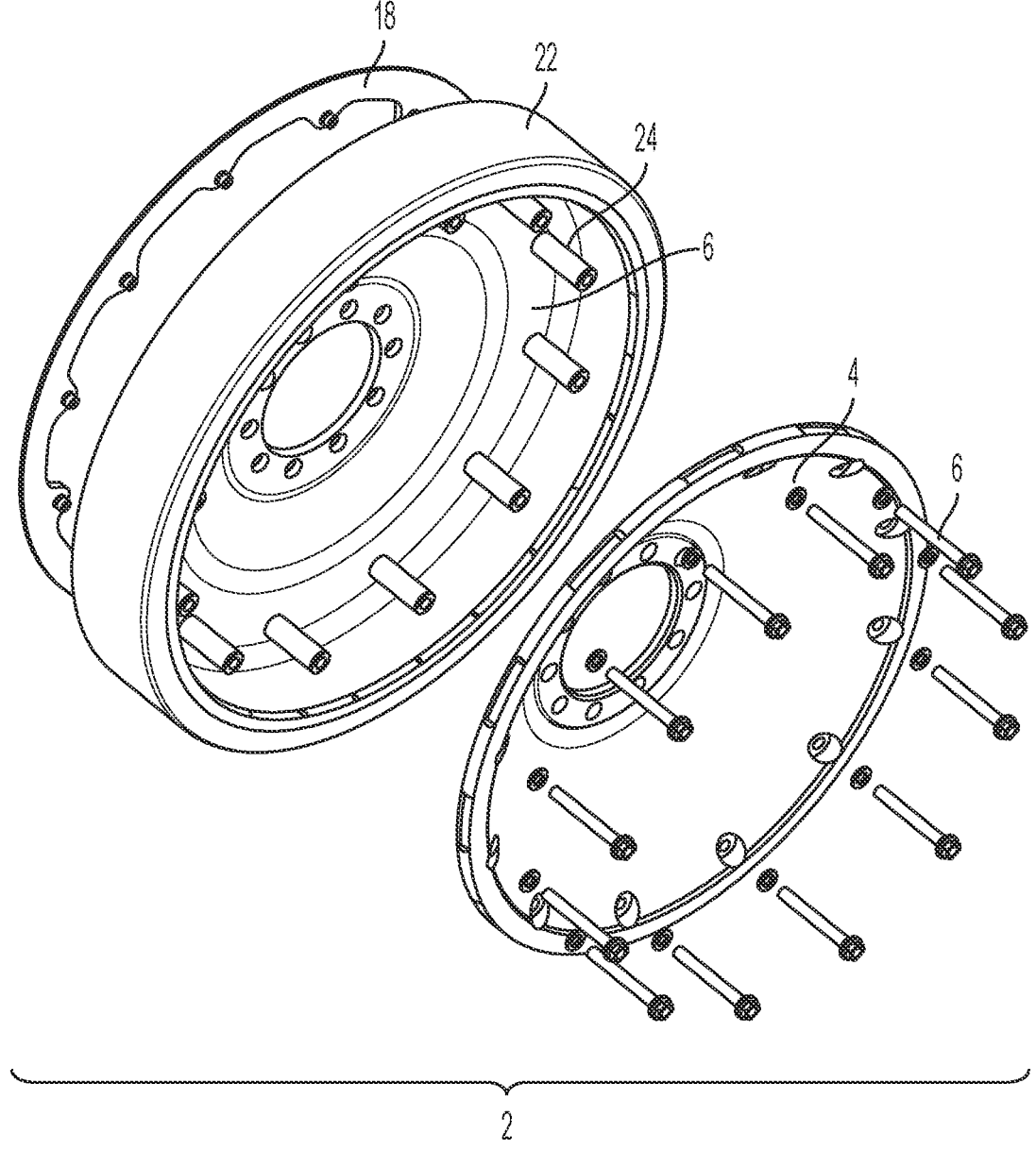
FIG. 5C is an exploded view of the road wheel and elastomeric pad shown in FIG. 1.
Figure 6:
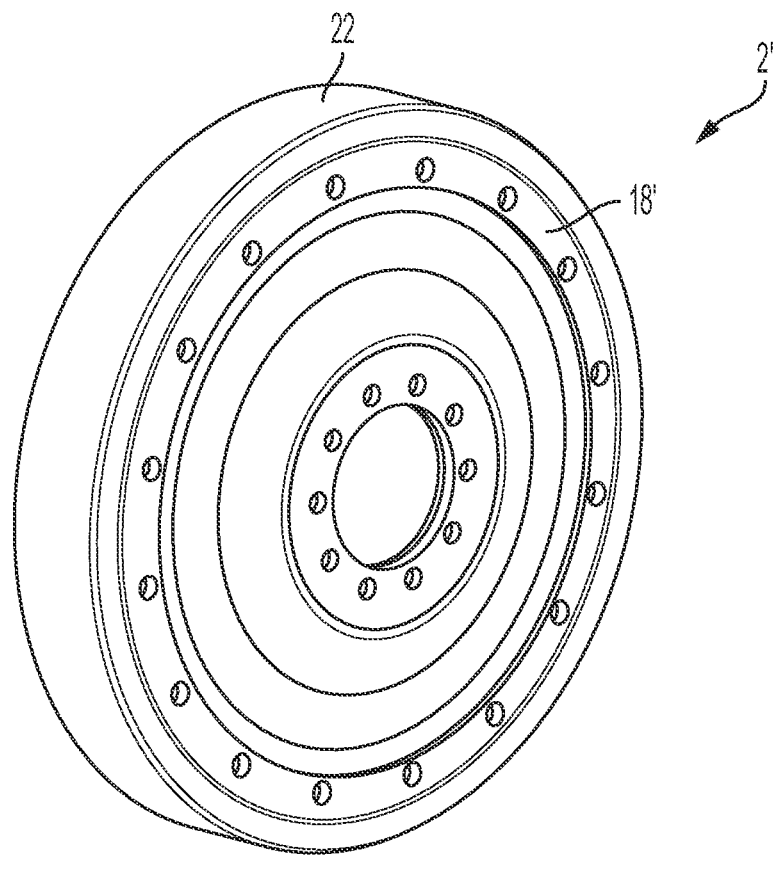
FIG. 6 is a front perspective view of a road wheel and elastomeric pad according to another example of the present disclosure.
Figure 7:
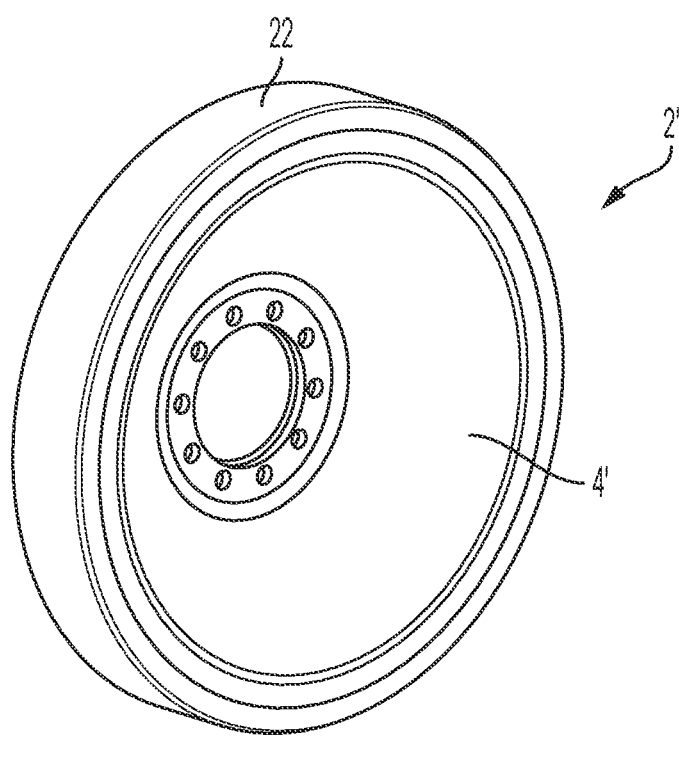
FIG. 7 is a rear perspective view of the road wheel and elastomeric pad of FIG. 6.
Figure 8:
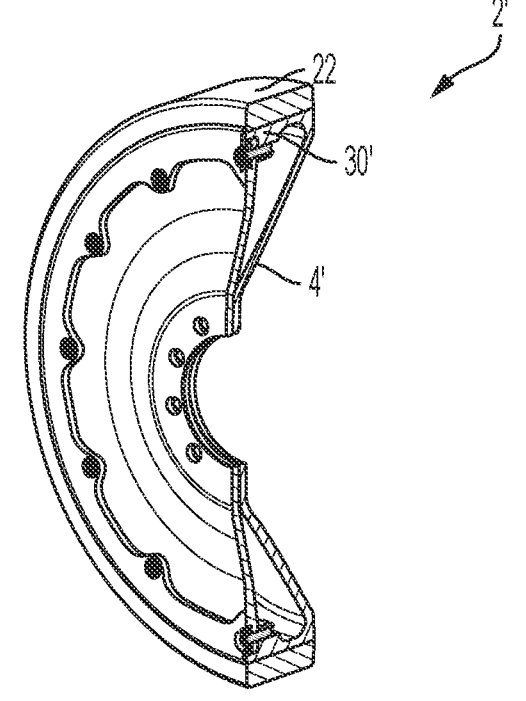
FIG. 8 is a cross-sectional view of the road wheel and elastomeric pad of FIG. 6.
Figure 9A:
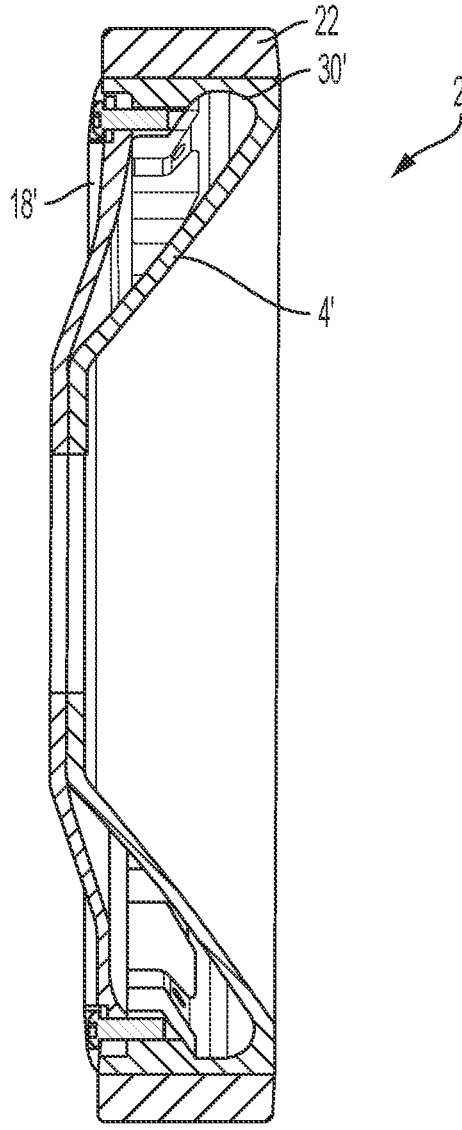
FIG. 9A is another cross-sectional view of the road wheel and elastomeric pad of FIG. 6.
Figure 9B:
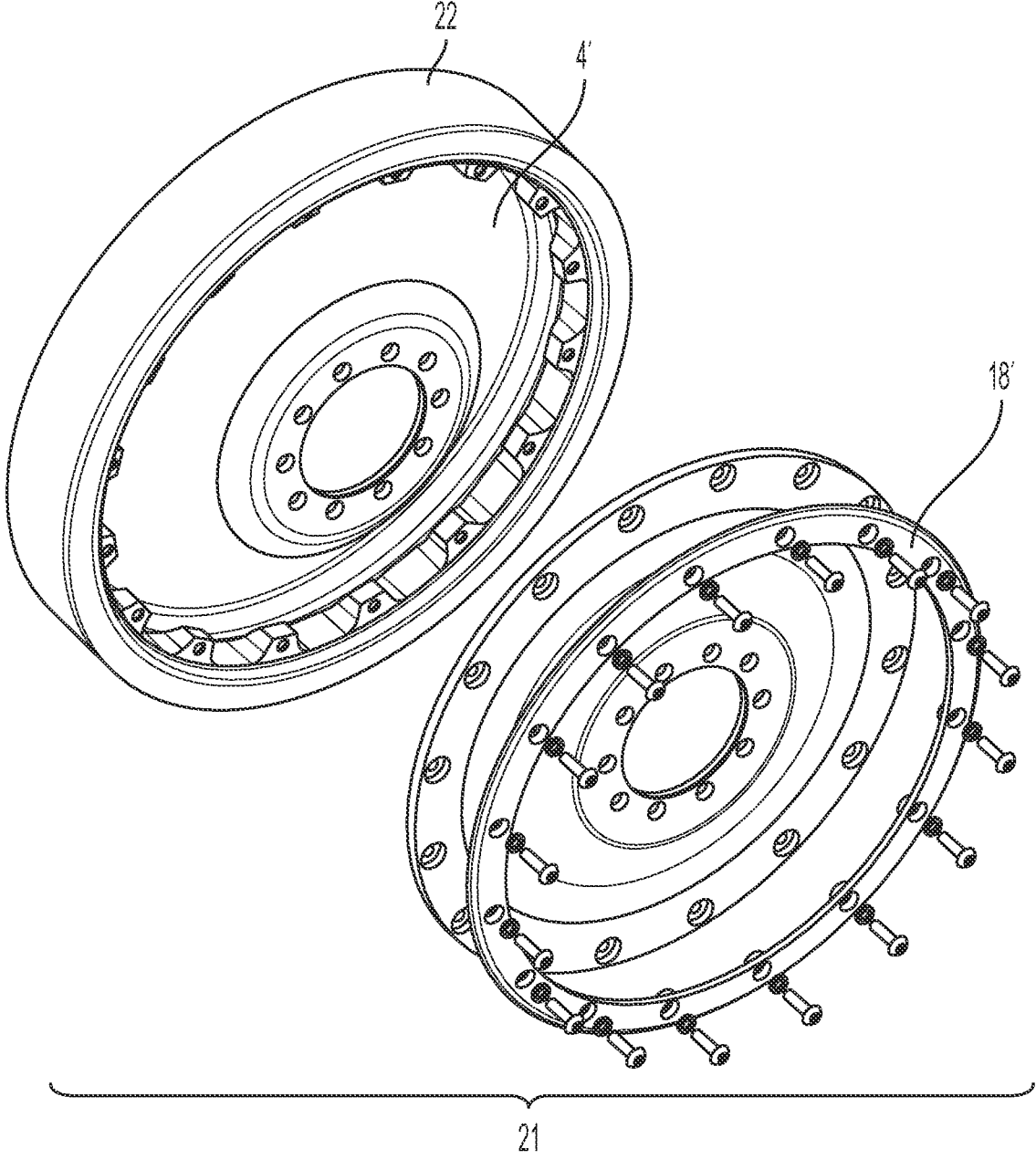
FIG. 9B is an exploded view of the road wheel and elastomeric pad of FIG. 6.

As shown in FIGS. 4 and 5, the rims 4, 6 may be connected to one another with a reverse dove-tail geometry that acts as a mechanical retention means around the perimeter of each rim 4, 6 to retain the first rim 4 to the second rim 6 in the event the fasteners 16 fail or loosen during service or use of the road wheel 2. In one example, the inner rim 4 may include a dove-tail tab 26 or plurality of tabs that extends from an outer perimeter thereof, while the outer rim 6 defines a dove-tail recess 28 or plurality of recesses in an outer perimeter thereof that is configured to receive the dove-tail tab(s) 26 of the inner rim 4. Assembly of the rims 4, 6 together requires centering the inner rim 4 on the outer rim 6 and aligning the matching set of tabs 26 on the inner rim 4 with the recesses 28 defined in the outer rim 6. Once aligned, the rims 4, 6 can be assembled together and then clocked to align the wear ring fastener pattern and install the fasteners 16. In the event of wear ring fastener 16 failure during use of the road wheel 2, the fasteners 16 prevent any relative rotation between the rims 4, 6, and the dove-tail connection prevents lateral separation of the rims 4, 6 around the perimeter of the road wheel 2. To remove the rim 6 from the other rim 4, the wear ring fasteners 16 can be removed, and the rims 4, 6 can be clocked until the recesses 28 are aligned with the tabs 26.

The road wheel 2 may have the elastomeric pad 22 adhered onto a flange 30 extending from the outer radial edge of the outer rim 6, which forms an L-shaped cross-section, while the inner rim 4 forms a mostly conical cross-section. In another example of the present disclosure illustrated in FIGS. 6-9, the elastomeric pad 22 may be adhered onto the inner rim 4'. The inner rim 4'; may include flange 30' that extends from an outer radial edge of the inner rim 4' to form a surface that supports the elastomeric pad 22. Using this configuration for the road wheel 2', recessed, blind fasteners on a larger bolt circle with protruding bosses on the inner rim 4' can be used to avoid contacting a center guide of the road wheel 2'. The blind fasteners are attached to protrusions on the inner rim 4'. It is also contemplated that the road wheel 2' could also use through-bolts with nuts on the opposite side of the inner rim 4'. It is also contemplated that the road wheel 2' could use through-bolts and nuts with spacers on a smaller bolt circle to avoid recessing the fasteners into the wear ring 18' with bosses on the back of the wear ring 18'.

Figure 14:
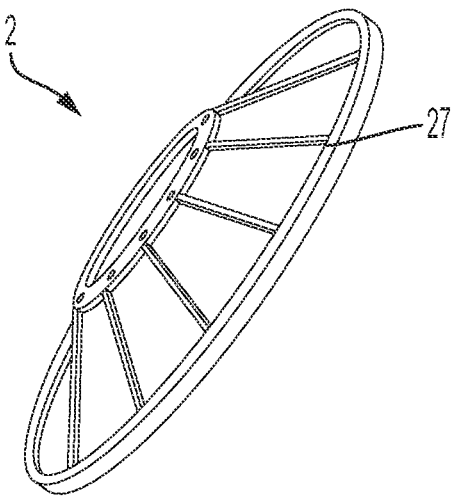
FIG. 14 is a perspective view of a road wheel including internal structural features according to one example of the present disclosure.
Figure 15:
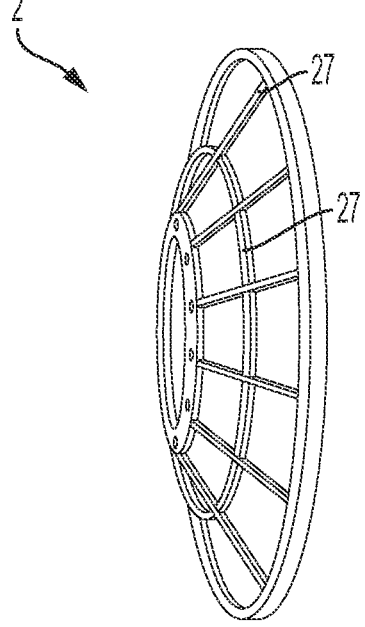
FIG. 15 is a perspective view of a road wheel including alternative internal structural features according to one example of the present disclosure.
Figure 16A:
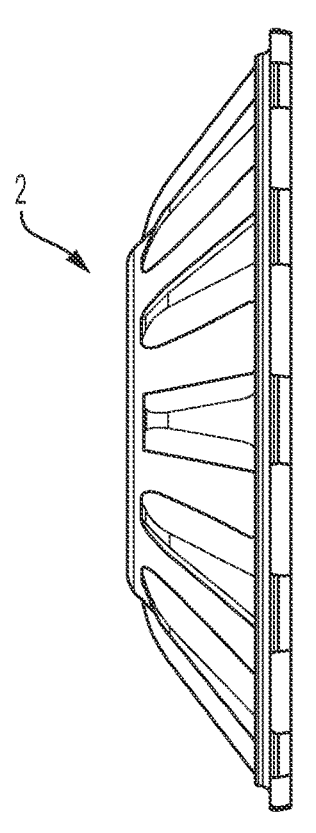
FIG. 16A is a perspective view of a road wheel including alternative internal structural features according to one example of the present disclosure.
Figure 16B:
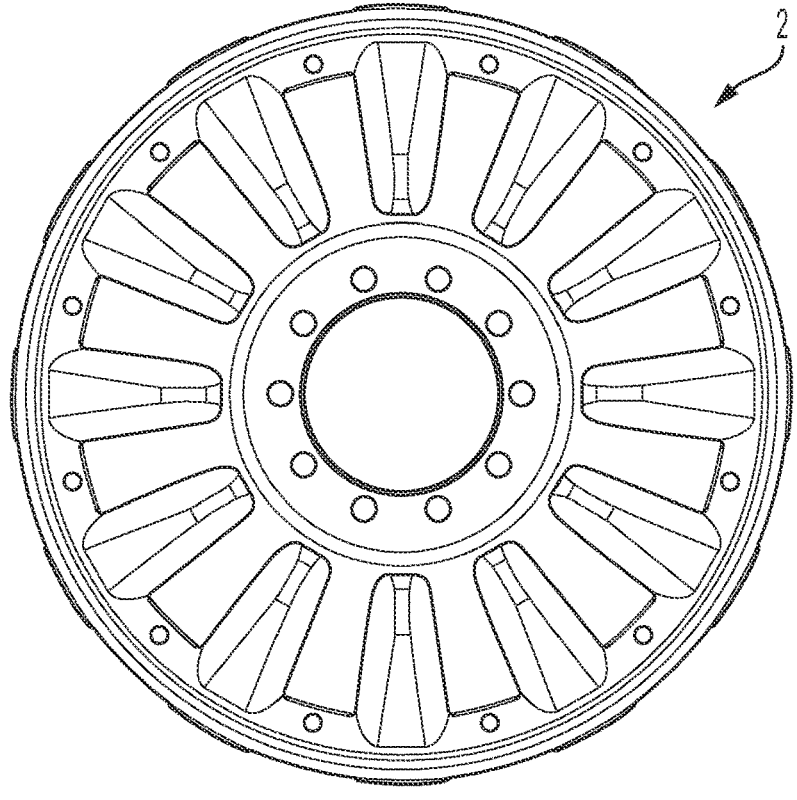
FIG. 16B is a front view of the road wheel of FIG. 16A.
Figure 17:
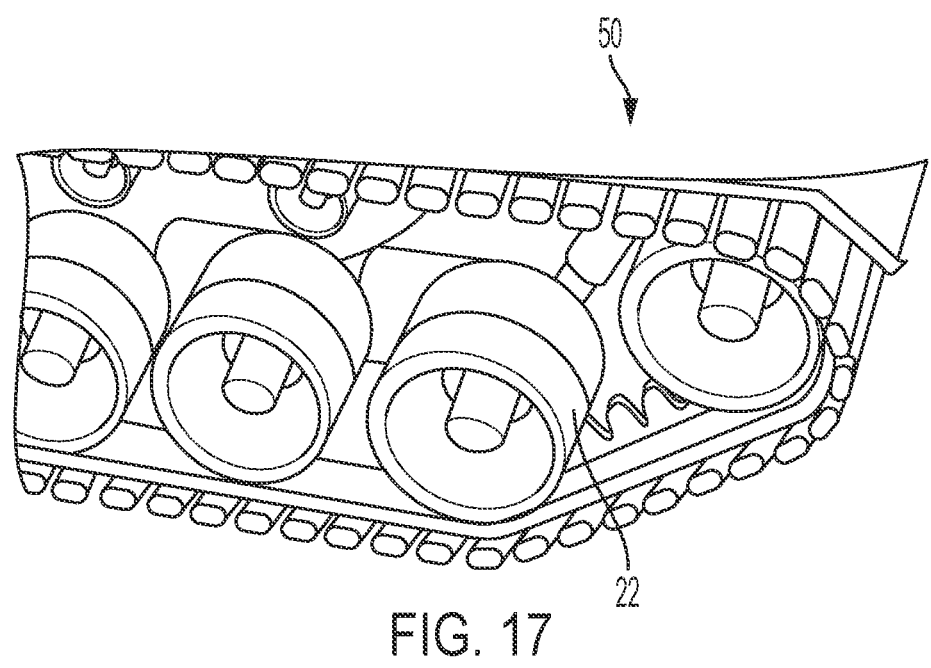
FIG. 17 is a perspective view of a tracked vehicle including a road wheel.

An additional aspect of the present disclosure is directed to the inclusion of internal features for structural reinforcement of the flat disc regions of each rim 4, 6. In one example, as shown in FIGS. 14 and 15, the internal features 27 may be ribs, struts, or any similar component arranged individually or collectively in a truss structure to stiffen the flat disc sections by preventing excess deflection as a result of external forces. While FIGS. 14 and 15 illustrate the structural reinforcement on the inner rim 4, one of ordinary skill in the art will understand that the same or similar structural reinforcement may be provided on the outer rim 6 in the same or similar position and arrangement. The internal features 27 can be manufactured as integrated features of the rims 4, 6 through forging, casting, or machining. The geometrical configuration of the internal features 27 may vary but would ultimately provide the same functionality to strengthen the flat disc portions of the rims 4, 6. It is ideal to locate stiffening features on the internal cavity and promote debris-shedding on the exterior, but may be located on either or both sides, resulting in a similar benefit. As shown in FIG. 17, a tracked vehicle 50 may include a first road wheel and a second road wheel, in which the first road wheel is connected to the second road wheel to form a recessed region between the road wheels. The recessed region may be created by the configuration and dimensions of the road wheels, and is configured and dimensioned to accommodate a guide on a track of the tracked vehicle. In one example, a first wear ring attached to the first road wheel and a second wear ring attached to the second road wheel are made of a material that has greater wear resistance than a material used to manufacture the road wheels.

While several aspects of the road wheel are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A road wheel for a vehicle, comprising:
a first rim half; and
a second rim half operatively connected to the first rim half,
wherein the first rim half comprises at least a first portion that is angled away from the second rim half,
wherein the second rim half comprises at least a first portion that is angled away from the first rim half,
wherein a hollow cavity is formed between the first portion of the first rim half and the first portion of the second rim half,
wherein the first rim half or the second rim half comprises a flange formed integral with the respective first rim half or the second rim half and that extends from an outer radial edge of the first rim half or the second rim half to support an elastomeric pad, and
wherein the flange of one rim half extends to rest on an outer edge of the other rim half to form the hollow cavity between the rim halves.

2. The road wheel as claimed in claim 1, wherein the first rim half and the second rim half are operatively connected to one another via at least one fastener around the perimeter, and at least one lug fastener connects the rim halves at a center portion.

3. The road wheel as claimed in claim 1, wherein the first rim half and the second rim half are welded together.

4. The road wheel as claimed in claim 1, wherein a wear-resistant material is applied to at least one of the first rim half and the second rim half.

5. The road wheel as claimed in claim 1, wherein at least one of the first rim half and the second rim half is a fabricated component made using a mold, using a tool, being machined, through additive manufacturing, being joined together from multiple pieces, or a combination thereof.

6. The road wheel as claimed in claim 1, wherein the first rim half is interlocked with the second rim half via a dovetail connection.

7. The road wheel as claimed in claim 1, wherein a surface coating is applied to at least one of the first rim half and the second rim half, in which the surface coating is composed of one of the following: a metallic material, a carbide, a ceramic oxide, and a combination of these materials.

8. A road wheel assembly, comprising:
an elastomeric pad; and
a road wheel, comprising:
    a first rim half; and
    a second rim half operatively connected to the first rim half,
wherein the elastomeric pad is adhered onto the road wheel,
wherein the first rim half comprises at least a first portion that is angled away from the second rim half,
wherein the second rim half comprises at least a first portion that is angled away from the first rim half,
wherein a hollow cavity is formed between the first portion of the first rim half and the first portion of the second rim half,
wherein the first rim half or the second rim half comprises a flange formed integral with the respective first rim half or the second rim half and that extends from an outer radial edge of the first rim half or the second rim half to support an elastomeric pad, and
wherein the flange of one rim half extends to rest on an outer edge of the other rim half to form the hollow cavity between the rim halves.

9. The road wheel assembly as claimed in claim 8, wherein the first rim half and the second rim half are operatively connected to one another via at least one fastener.

10. The road wheel assembly as claimed in claim 8, wherein the first rim half and the second rim half are welded together.

11. The road wheel assembly as claimed in claim 8, wherein a wear-resistant material is applied to at least one of the first rim half and the second rim half.

12. The road wheel assembly as claimed in claim 8, wherein at least one of the first rim half and the second rim half is a fabricated component made using a mold, using a tool, being machined, through additive manufacturing, being joined together from multiple pieces, or a combination thereof.

13. The road wheel assembly as claimed in claim 8, wherein the first rim half is interlocked with the second rim half via a dovetail connection.

14. The road wheel assembly as claimed in claim 8, wherein a surface coating is applied to at least one of the first rim half and the second rim half, in which the surface coating is composed of one of the following: a metallic material, a carbide, a ceramic oxide, and a combination of these materials.

15. The road wheel assembly as claimed in claim 8, further comprising an additional road wheel, wherein the road wheel is connected to the additional road wheel to form a recessed region between the road wheels, wherein the recessed region is created by the configuration and dimensions of the road wheels, and is configured and dimensioned to accommodate a guide on a track.

* * * * *